(12) United States Patent
Lin et al.

(10) Patent No.: US 12,682,230 B2
(45) Date of Patent: Jul. 14, 2026

(54) CONVOLUTION WITH KERNEL EXPANSION AND TENSOR ACCUMULATION

(71) Applicant: QUALCOMM Incorporated, San Diego, CA (US)

(72) Inventors: Jamie Menjay Lin, San Diego, CA (US); Yash Sanjay Bhalgat, San Diego, CA (US); Edwin Chongwoo Park, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 999 days.

(21) Appl. No.: 17/805,021

(22) Filed: Jun. 1, 2022

(65) Prior Publication Data

US 2022/0391702 A1     Dec. 8, 2022

Related U.S. Application Data

(60) Provisional application No. 63/196,122, filed on Jun. 2, 2021.

(51) Int. Cl.
*G06N 3/08* (2023.01)
*G06F 9/345* (2018.01)
*G06N 3/04* (2023.01)

(52) U.S. Cl.
CPC ............. *G06N 3/08* (2013.01); *G06F 9/3455* (2013.01); *G06N 3/04* (2013.01)

(58) Field of Classification Search
None
See application file for complete search history.

(56) References Cited

U.S. PATENT DOCUMENTS

| 2019/0392020 | A1 | 12/2019 | Balasubramaniyan et al. | |
| 2020/0160494 | A1* | 5/2020 | Hwang | G06N 3/045 |
| 2020/0272892 | A1* | 8/2020 | Desappan | G06F 12/0804 |
| 2021/0200993 | A1* | 7/2021 | Chen | G06V 10/82 |
| 2021/0406646 | A1* | 12/2021 | Han | G06N 3/06 |
| 2022/0222317 | A1* | 7/2022 | Weisel | G06F 17/153 |
| 2022/0309316 | A1* | 9/2022 | Nama | G06T 1/60 |

OTHER PUBLICATIONS

Shi W., et al., "Real-Time Single Image and Video Super-Resolution Using an Efficient Sub-Pixel Convolutional Neural Network," arXiv: 1609.05158v2 [cs.CV], Sep. 23, 2016, 10 Pages.
(Continued)

*Primary Examiner* — Augustine K. Obisesan
(74) *Attorney, Agent, or Firm* — Patterson & Sheridan LLP

(57) ABSTRACT

Certain aspects of the present disclosure provide techniques for kernel expansion. An input data tensor is received at a first layer in a neural network, and a first convolution is performed for a first kernel, where the first kernel has a size greater than a preferred size. Performing the first convolution comprises generating a plurality of intermediate tensors by performing a plurality of intermediate convolutions using a plurality of intermediate kernels with a size of the preferred size, and accumulating the plurality of intermediate tensors to generate an output tensor for the first convolution.

30 Claims, 12 Drawing Sheets

600 ⟶

605
Receive data tensor

610
Identify a first convolution kernel

615
Decompose kernel into two or more intermediate kernels

620
Perform convolutions using hardware designed for intermediate kernel size

625
Accumulate results to generate output for first convolution kernel

(56) References Cited

OTHER PUBLICATIONS

Bhalgat Y., et al., "Structured Convolutions for Efficient Neural Network Design", arxiv.org, Cornell University Library, 201 Olin Library Cornell University Ithaca, NY 14853, Oct. 31, 2020, XP081806552, Aug. 6, 2020, pp. 1-12, XP081734780, the whole document.
International Search Report and Written Opinion—PCT/US2022/072709—ISA/EPO—Nov. 11, 2022.

* cited by examiner

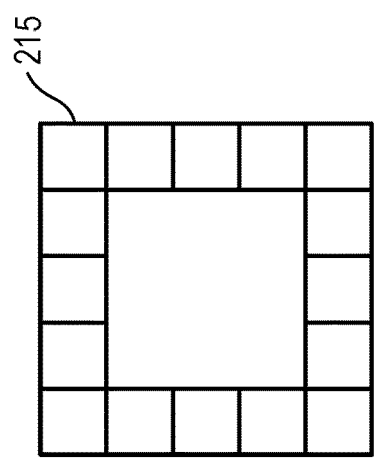
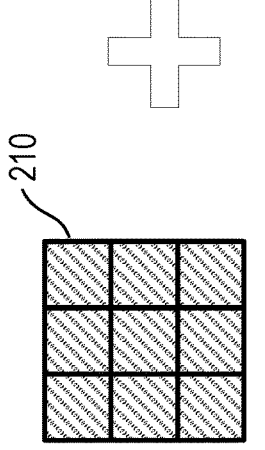
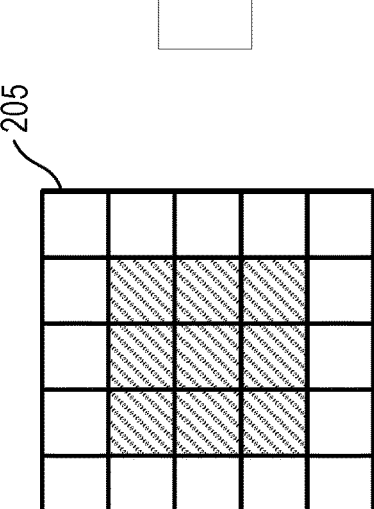
*FIG. 2*

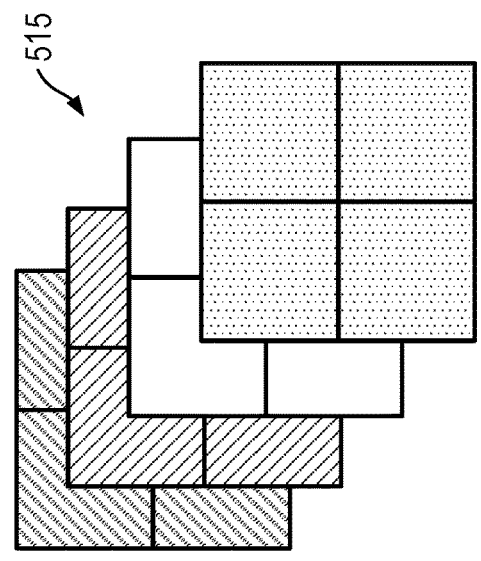
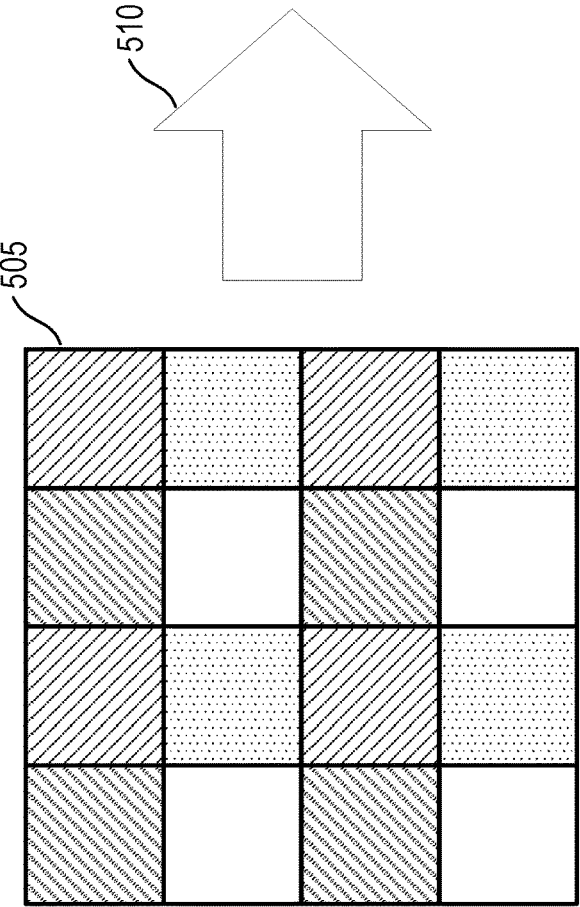
*FIG. 5*

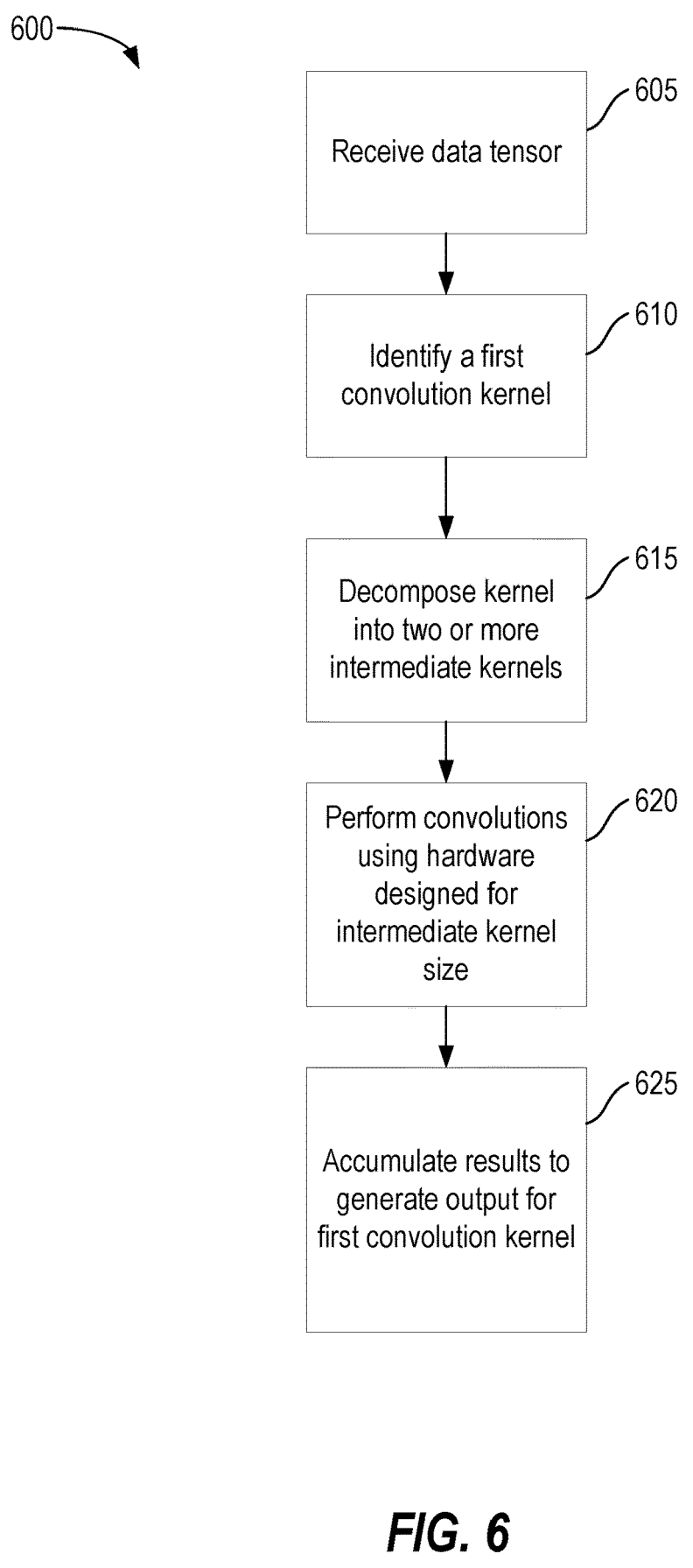

600

605

Receive data tensor

610

Identify a first
convolution kernel

615

Decompose kernel
into two or more
intermediate kernels

620

Perform convolutions
using hardware
designed for
intermediate kernel
size

625

Accumulate results to
generate output for
first convolution kernel

*FIG. 6*

700

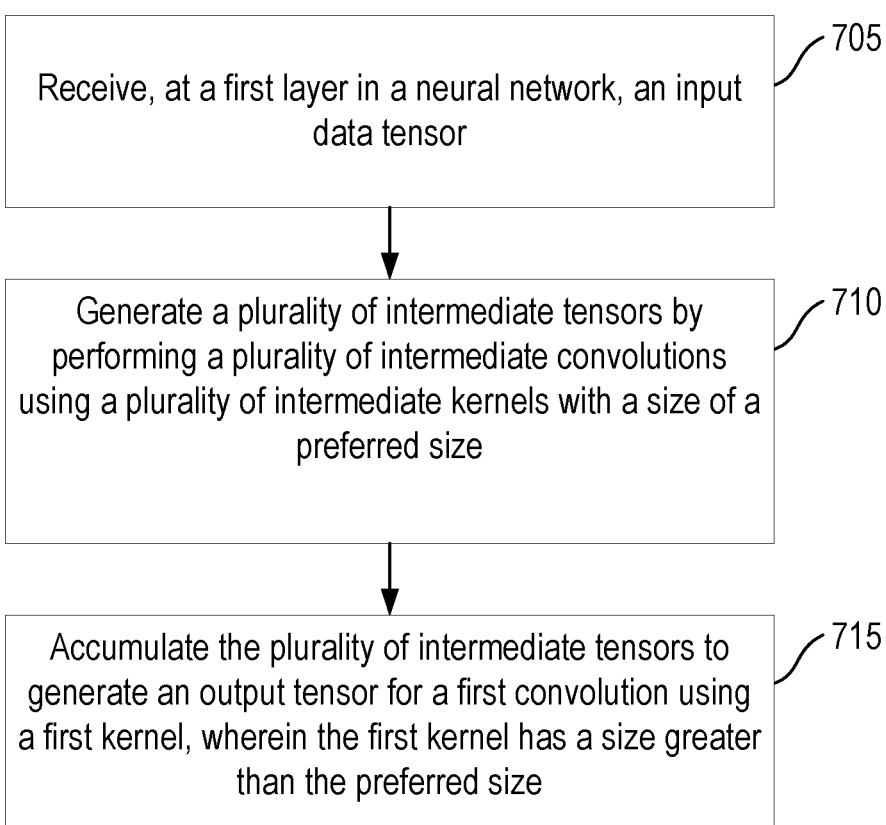

Receive, at a first layer in a neural network, an input data tensor 705

Generate a plurality of intermediate tensors by performing a plurality of intermediate convolutions using a plurality of intermediate kernels with a size of a preferred size 710

Accumulate the plurality of intermediate tensors to generate an output tensor for a first convolution using a first kernel, wherein the first kernel has a size greater than the preferred size 715

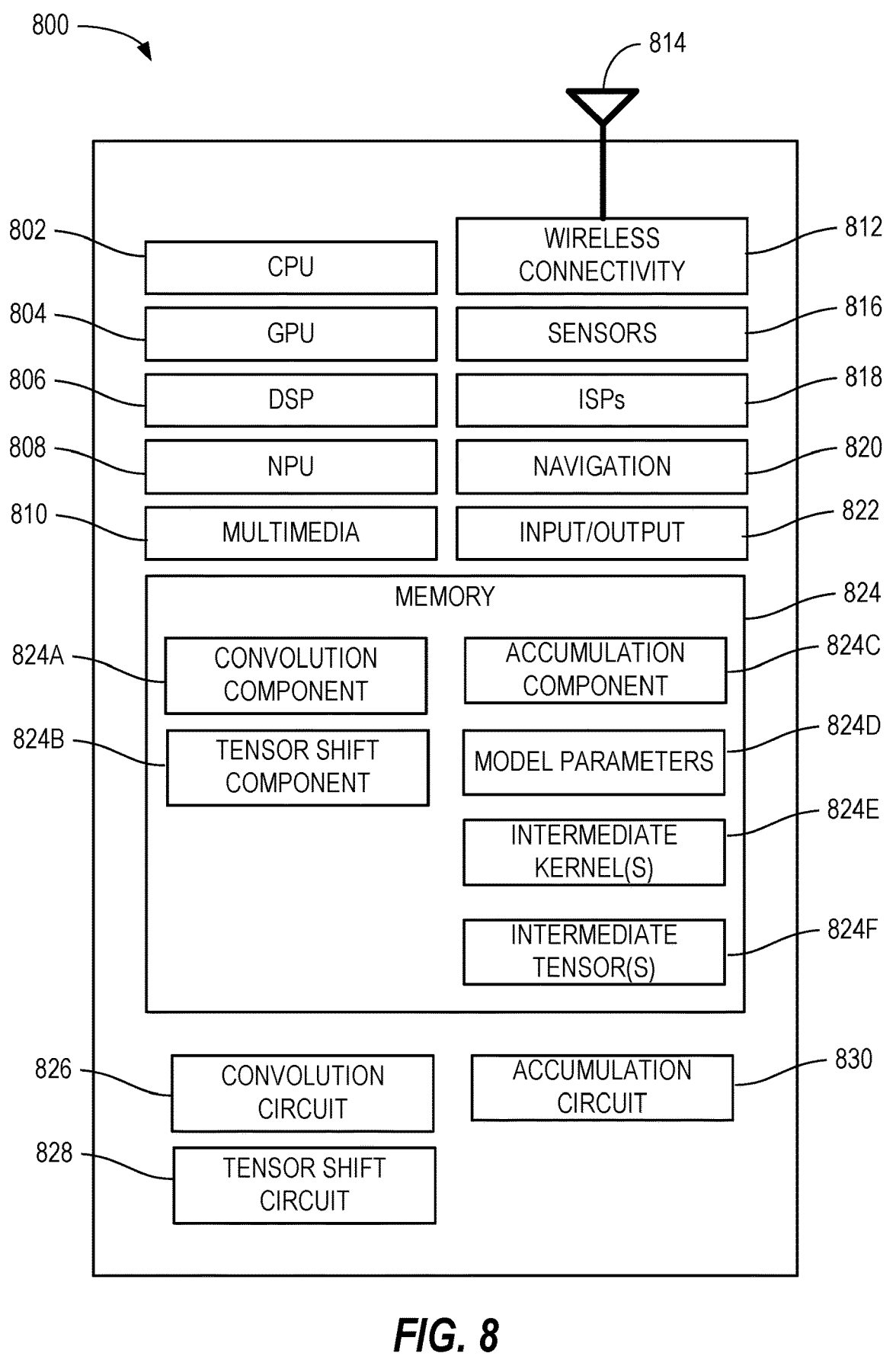

| 802 | CPU |
| 804 | GPU |
| 806 | DSP |
| 808 | NPU |
| 810 | MULTIMEDIA |

| WIRELESS CONNECTIVITY | 812 |
| SENSORS | 816 |
| ISPs | 818 |
| NAVIGATION | 820 |
| INPUT/OUTPUT | 822 |

MEMORY — 824

| 824A | CONVOLUTION COMPONENT |
| 824B | TENSOR SHIFT COMPONENT |

| ACCUMULATION COMPONENT | 824C |
| MODEL PARAMETERS | 824D |
| INTERMEDIATE KERNEL(S) | 824E |
| INTERMEDIATE TENSOR(S) | 824F |

| 826 | CONVOLUTION CIRCUIT |
| 828 | TENSOR SHIFT CIRCUIT |

| ACCUMULATION CIRCUIT | 830 |

*FIG. 8*

CONVOLUTION WITH KERNEL EXPANSION AND TENSOR ACCUMULATION

CROSS-REFERENCE TO RELATED APPLICATIONS

This application claims the benefit of and priority to U.S. Provisional Patent Application No. 63/196,122, filed on Jun. 2, 2021, the entire contents of which are incorporated herein by reference.

INTRODUCTION

Aspects of the present disclosure relate to machine learning techniques.

Convolution is a popular machine learning processing operation used in a wide variety of machine learning model architectures, including as part of convolutional neural network (CNN) models. For example, convolutions have been used to extract features and enable a wide variety of tasks, including signal processing, computer vision, and natural language processing.

CNNs typically use a set of convolution kernels (also referred to as filters in some cases), where each kernel is applied to the input data tensor (or to feature tensors within the CNN) to generate corresponding output. Generally, using larger kernel sizes results in a broader receptive field, which can result in improved feature extraction in some applications.

However, convolution is a compute-intensive process, requiring a substantial number of operations (e.g., multiplications and additions). As the kernel size increases, so too does the power consumption and computational complexity of the convolution process.

While certain hardware components have been optimized to perform efficiently for particular kernel sizes, these components are generally much less efficient, or even incompatible, with kernel sizes outside of a narrow, optimal range of kernel sizes.

Accordingly, techniques are needed for performing efficient machine learning with a wider range of kernel sizes.

BRIEF SUMMARY

Certain aspects provide a method, comprising: receiving, at a first layer in a neural network, an input data tensor; and performing a first convolution for a first kernel, wherein the first kernel has a size greater than a preferred size, comprising: generating a plurality of intermediate tensors by performing a plurality of intermediate convolutions using a plurality of intermediate kernels with a size of the preferred size; and accumulating the plurality of intermediate tensors to generate an output tensor for the first convolution.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

BRIEF DESCRIPTION OF THE DRAWINGS

The appended figures depict certain aspects of the one or more aspects and are therefore not to be considered limiting of the scope of this disclosure.

FIG. 2 depicts an example technique for non-overlapping kernel expansion.

FIGS. 4A, 4B, and 4C depict example kernel expansions for various kernel sizes.

FIG. 5 depicts an example technique for kernel expansion using dimensionality transformation.

FIG. 6 is an example flow diagram illustrating a method for performing kernel convolution using hardware optimized for smaller kernel sizes.

FIG. 7 is an example flow diagram illustrating a method for performing convolution using intermediate kernels.

FIG. 8 depicts an example processing system configured to perform various aspects of the present disclosure.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Aspects of the present disclosure provide techniques for kernel expansion to enable large kernels to be efficiently executed on hardware designed for smaller kernels.

Owing at least in part to the computational complexity of using large kernels, many existing CNNs rely largely on kernels with a size of three (e.g., 3×3), or a size five (e.g., 5×5). To ensure models can process data efficiently, therefore, a variety of hardware components have been designed and optimized for these common kernel sizes. However, to achieve increased receptive fields (and improved accuracy in some implementations), it may be desirable to use larger kernels (e.g., 7×7 or 9×9).

Some existing systems endeavor to support multiple kernel sizes by allocating independent hardware (e.g., arithmetic computation data paths) for individual kernel sizes. However, this adds expense to the system and generally requires additional logic gates (and therefore a larger hardware or chip area), while also lowering the utilization rate for the logic gates and requiring higher power consumption.

Another existing approach is to force approximation in convolution for a given (larger) kernel size with another (generally smaller) kernel size supported in hardware, leading to non-identical arithmetic functions. This may degrade performance, and is generally not preferred in typical use cases.

Aspects of the present disclosure provide a variety of techniques involving kernel expansion to enable hardware, designed for a particular preferred kernel size, to support variable kernel sizes (including larger kernels) efficiently. That is, aspects of the present disclosure allow smaller kernels preferred by hardware components to be efficiently and effectively expanded to cover larger kernel sizes. In some aspects, highly optimized arithmetic data paths are allocated for common (hardware-preferred) convolution kernels (e.g., 2×2, 3×3, 4×4, or 5×5), while additional light-weight logic is used to support identical arithmetic for larger or expanded kernels (e.g., 7×7, 9×9, and the like).

Because aspects of the present disclosure may require only a small number of additional components, chip area and power consumption remain low while system flexibility is significantly improved (enabling use of larger convolutional kernels). Thus a wider array of machine learning model architectures may be implemented, which not only improves device performance (on devices implementing such model architectures), but also helps to "future-proof" such devices against evolving architecture designs that may use differently sized kernels compared to those popular today.

Accordingly, aspects described herein overcome conventional limitations with convolution hardware, and improve the performance of a variety of machine learning models and systems.

Example Convolution Using Kernel Expansion

Figure 1:
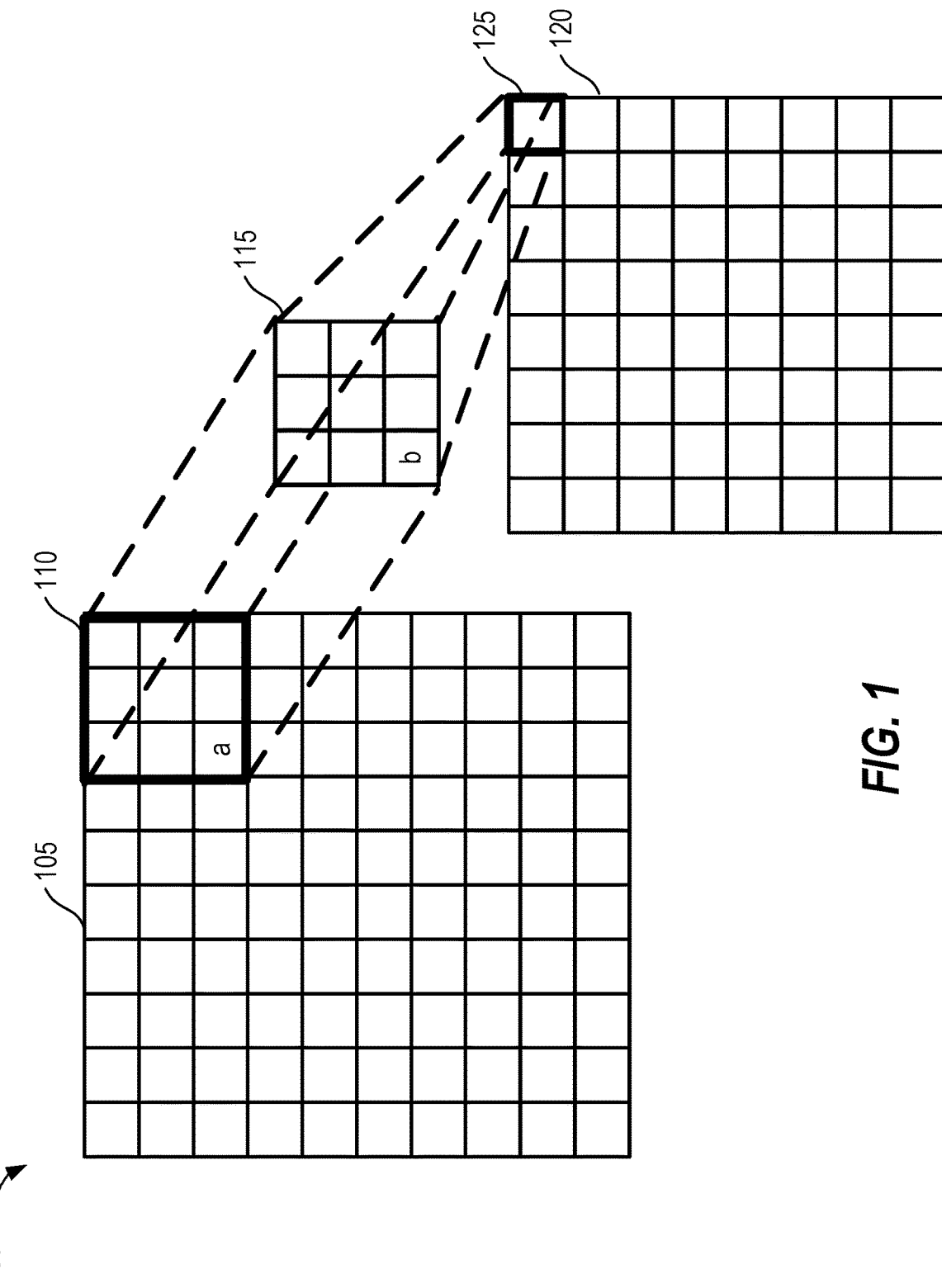
FIG. 1 depicts an example convolution using kernel expansion.

FIG. 1 depicts an example convolution process. In the illustrated workflow 100, a convolution kernel 115 is convolved with an input tensor 105 in order to generate an output tensor 120. In some aspects, the input tensor 105 may be referred to as a feature map or feature tensor (e.g., if it is output from a prior layer in a model). This input tensor 105 may be received from a prior layer in a CNN, or may be received as original input to the CNN model. In the illustrated example, the individual elements in the input tensor 105 are reflected by the grid of squares. In this example, the input tensor 105 has spatial dimensionality (e.g., height and width) of ten. In various aspects, however, the input tensor 105 may be of any spatial size, and may also include a depth (e.g., channel) dimension (e.g., a depth greater than or equal to one).

As illustrated, the convolution process can generally include processing a set of data elements in the input tensor 105 using the kernel 115 to generate a corresponding element in the output tensor 120. This process may be referred to in some aspects as "convolving" the input tensor 105 (or subset of elements thereof) with the kernel 115. In the illustrated example, a set of elements 110 (also referred to as a patch or receptive field in some aspects) is convolved with the kernel 115 to generate an output element 125. In some aspects, the convolution process includes multiplying each element in the set of elements 110 with the corresponding element in the kernel 115.

As used herein, corresponding elements refers to an element in the input tensor 105 (or set of elements 110) and an element in the kernel 115 that align, given the current position of the kernel 115. For example, the seventh element in the set of elements 110 (labeled "a" in the illustrated example) may be multiplied by the seventh element in the kernel 115 (labeled "b" in the illustrated example). The resulting products of each such multiplication can then be summed or otherwise aggregated to generate the output element 125.

In some aspects, the kernel 115 can be iteratively (sequentially or in parallel) applied to different sets of elements from the input tensor 105 in order to generate the output tensor 120. This may generally be referred to as "striding" the kernel 115 across the input tensor 105.

In the illustrated example, as the kernel 115 is 3×3, applying the kernel 115 to a patch of the input tensor 105 requires nine multiplications. Some hardware may be optimized or otherwise designed to operate efficiently on such kernels (e.g., performing nine multiplications in parallel). However, if the kernel 115 were larger (e.g., 5×5), then such hardware designed to operate on 3×3 kernels may perform with significant inefficiencies (or fail to perform at all). For example, hardware components typically have a limit on the number of resources available (e.g., multipliers, register accesses, and the like).

In aspects of the present disclosure, therefore, the system may decompose or otherwise subdivide the kernel to a set of smaller compute processes in order to allow the convolution to be performed using intermediate kernels of the preferred size. In various aspects, this may generally result in a set of intermediate tensors, which can then be accumulated to generate the final output tensor for the convolution process. This may be referred to as "kernel expansion" in some aspects, as the preferred kernel size for the hardware is effectively expanded to larger kernel sizes.

For example, in one aspect, the system may use non-overlapping kernel expansion to process different subsets of the kernel sequentially or in parallel. Such an aspect is described in more detail below with reference to FIG. 2. In one aspect, the system may use kernel expansion and accumulation (either in place or using pointwise convolutions) via a set of smaller intermediate kernels, as described in more detail below with reference to FIGS. 3A-3C and FIGS. 4A-4C. In one aspect, the system may use dimensionality transformations to modify the dimensionality of the kernel, as described in more detail below with reference to FIG. 5.

Example Technique for Non-Overlapping Kernel Expansion

FIG. 2 depicts an example technique for non-overlapping kernel expansion. In the illustrated workflow 200, a convolution kernel 205 with a size of five in each spatial dimension (e.g., 5×5) is used in a particular convolution step. That is, the kernel 205 may be convolved with an input tensor (e.g., input tensor 105) in a particular layer of a CNN. Although the illustrated example includes a 5×5 kernel 205, aspects of the workflow 200 are readily applicable to kernels of any size.

In the illustrated example, the preferred size of the hardware that will perform the convolution may generally be smaller than 5×5. For example, the hardware may be designed or intended to operate on 3×3 kernels. In one aspect, therefore, the system can decompose the kernel 205 to multiple sub-processes.

In the illustrated aspect, the system may decompose the kernel 205 into two sets of elements, set 210 and set 215, and process the input patch using each set 210 and 215 separately. Although two sets 210 and 215 are depicted, the system may decompose the kernel 205 into any number of sets of elements.

For example, as illustrated, each application of the kernel 205 will require performing nine multiplications using the set 210, as well as sixteen multiplications using the set 215. The resulting products of each may then be summed or aggregated, as discussed above, to generate an element in the output tensor. In one aspect, the kernel 205 can then be strided to the next set of input elements, and the workflow 200 can be repeated.

In some aspects, the system decomposes the kernel 205 into intermediate kernels (e.g., sets 210 and 215) based at least in part on the hardware support of the system. That is, the system may ensure that each such set has an appropriate number of elements, based on the number of operations that the hardware can perform efficiently at a given time (e.g., the number of multiplications that can be performed in parallel). For example, if the relevant hardware is configured to perform nine multiplications in parallel (e.g., for 3×3 kernels), then the system may decompose the kernel 205 into sets of elements with no more than nine elements in each set.

Although the illustrated example depicts decomposing the kernel 205 into two sets: the central elements (set 210) and the perimeter elements (set 215), the kernel 205 may be divided according to any suitable patterns or criteria. For example, the kernel 205 may be decomposed into one set corresponding to the nine elements in the upper-left corner of the kernel 205, and one or more sets for the remaining elements.

In some aspects, depending on specific hardware implementation factors, various inefficiencies or changes to the workflow 200 may be introduced. For example, suppose the kernel 205 and/or set of elements 215 is to be processed using hardware designed to operate efficiently by row and/or column. In some such aspects, though only sixteen multiplications are needed for the set 215, the system may use five multiplications in each row/column, thereby performing a total of twenty multiplications (instead of the required sixteen). In some aspects, the particular delineation of the kernel 205 may vary depending on such hardware considerations.

Example Technique for Kernel Expansion and Accumulation

Figure 3A:
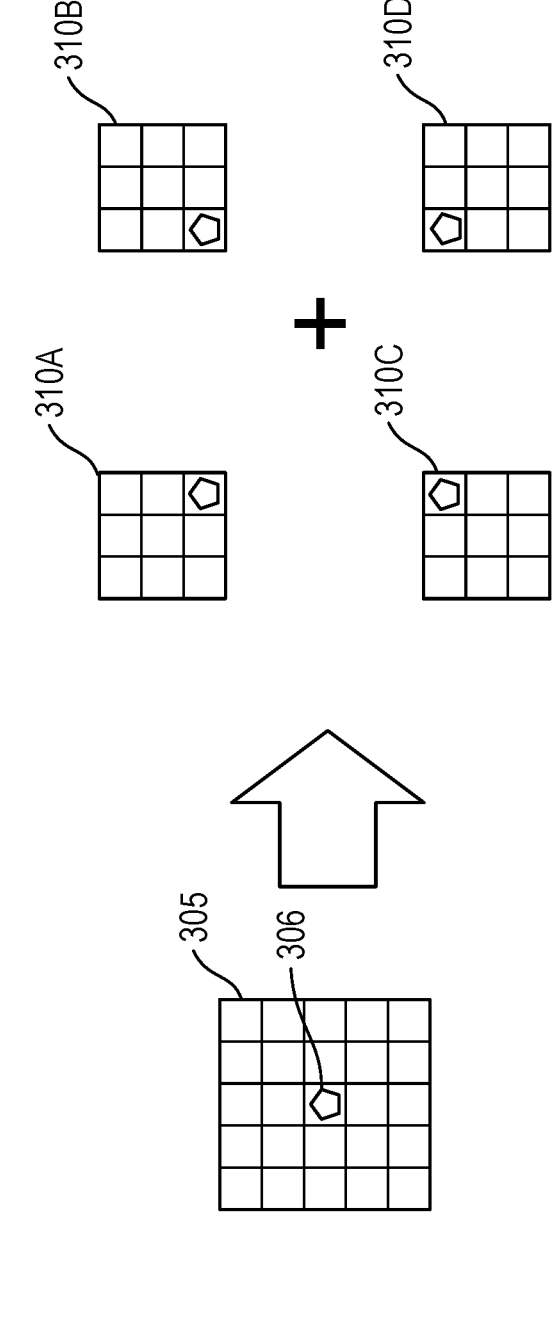
FIG. 3A depicts an example technique for kernel expansion and accumulation with intermediate kernels.

FIG. 3A depicts an example technique for kernel expansion and accumulation with intermediate kernels. In the workflow 300A, a kernel 305 with a size of five in each spatial dimension (e.g., 5×5) is decomposed into a set of intermediate kernels 310A-D. Although the illustrated example includes a 5×5 kernel 305, aspects of the workflow 300 are readily applicable to kernels of any size.

Further, in the illustrated example, the hardware-preferred kernel size may be 3×3. That is, the hardware that is used to perform the convolution using the kernel 305 may be designed or optimized for 3×3 kernels. Thus, the system can decompose the kernel 305 into a set of intermediate kernels 310A-D, each with a size of 3×3. By using four such intermediate kernels 310A-D, the larger kernel 305 can be convolved efficiently on hardware designed for smaller kernels.

In the illustrated workflow 300A, the center of the kernel 305 is indicated by a pentagon 306. In each intermediate kernel 310A-D, the pentagon is included to indicate the position of the intermediate kernel 310A-D with respect to the center of the kernel 305. In the illustrated example, the intermediate kernel 310A corresponds to the upper-left portion of the kernel 305, the intermediate kernel 310B corresponds to the upper-right portion of the kernel 305, the intermediate kernel 310C corresponds to the lower-left portion of the kernel 305, and the intermediate kernel 310D corresponds to the lower-right portion of the kernel 305.

In the illustrated examples, the intermediate kernels 310 overlap. In some aspects, however, the intermediate kernels 310 may be arranged to avoid such overlap. For example, the center of the intermediate kernels 310B, 310C, and 310D may each be placed nearer to their respective corners of the original kernel 305, avoiding kernel overlap. Generally, the intermediate kernels 310 may be tiled or tessellated in any suitable pattern to cover the elements of the kernel 305. In some such aspects, the portions of the intermediate kernels 310 that extend beyond the edges of the original kernel 305 are set to zero (or otherwise designated as empty) to avoid extraneous multiplications. In at least one aspect, the system can set one or more elements in one or more intermediate kernels to zero (or otherwise designate them as empty) in order to correct for overlap (that is, to mathematically cancel or mask the overlap using elements with zero values), as discussed in more detail below. For example, from a set of overlapping elements in two or more intermediate kernels that each correspond to a single element of the original kernel, the system may set all but one of these elements to zero, allowing the sole non-zero element (from the set of overlapping elements) to substitute for the original element in the original kernel. In some aspects, the system can refrain from processing or multiplying these zero-padded (empty) elements. That is, while applying an intermediate kernel with zero(s) added (e.g., due to overlap), the system may skip these elements to avoid incurring unnecessary computational expense and power consumption (because the resulting value will always be zero). This may be referred to as "zero-skipping" in some aspects.

In some aspects, in addition to or instead of setting all but one of the set of overlapping elements to zero, the system can use other values to account for the overlap. In one such aspect, the system may distribute or split the weights of any overlapped kernel elements across the corresponding elements of multiple intermediate kernels. For example, the central element in kernel 305, indicated by pentagon 306, is present in all four intermediate kernels 310. In some aspects, the system may distribute the value of this element (e.g., the weight) across the corresponding elements in two or more intermediate kernels 310 (e.g., the lower-right element of intermediate kernel 310A, the lower-left element of intermediate kernel 310B, the upper-right element of intermediate kernel 310C, and/or the upper-left element of intermediate kernel 310D) such that their sum is equal to the original value in the kernel 305. This can allow for equivalent convolution without inserting values of zero.

By using the intermediate kernels 310 and accumulating the results (as discussed in more detail below), the system effectively convolves using the kernel 305 despite the lower hardware preference.

Example Technique for Kernel Expansion and Volume Shifting

Figure 3B:
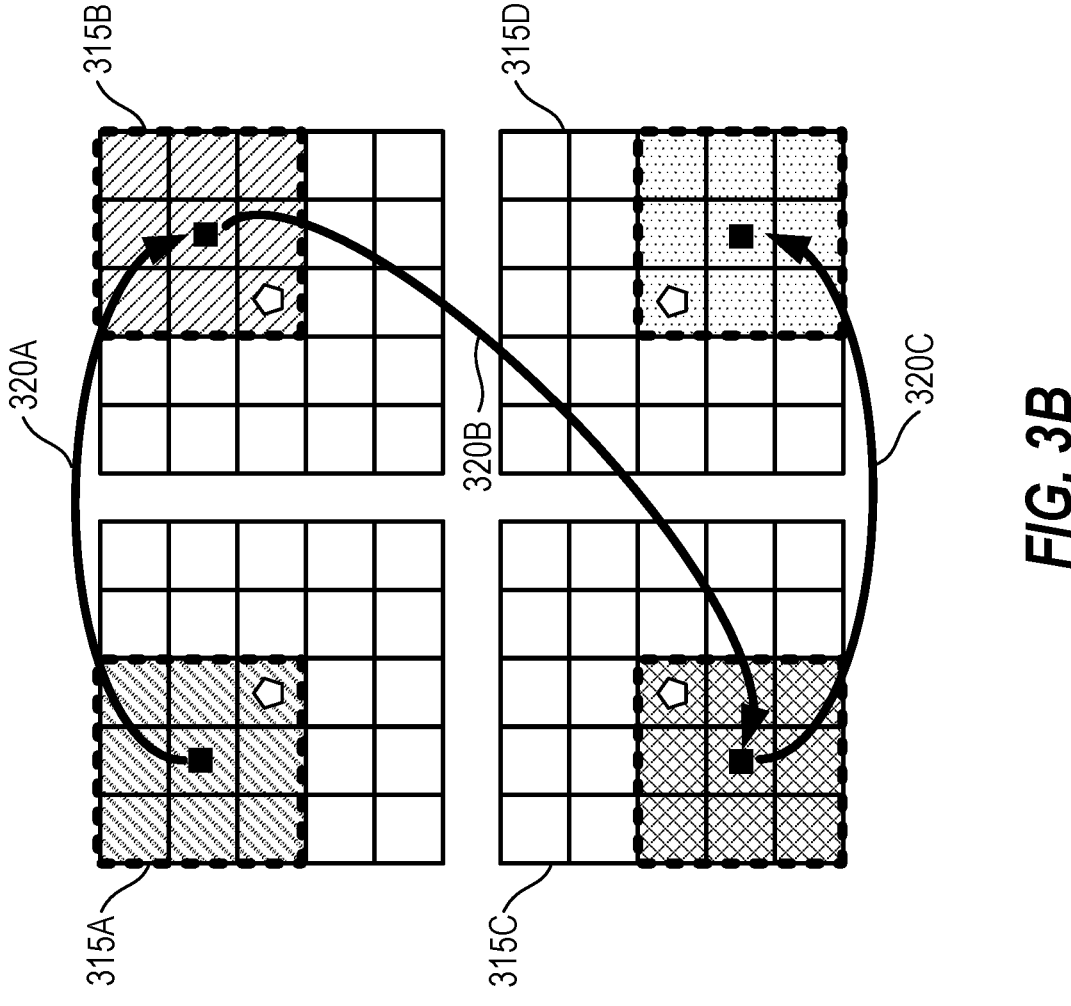
FIG. 3B depicts an example technique for tensor volume shifting and kernel expansion with intermediate kernels.

FIG. 3B depicts an example technique for tensor volume shifting and kernel expansion with intermediate kernels. In one aspect, the workflow 300B depicts a method of processing and accumulating intermediate tensors generated using intermediate kernels 310 illustrated in FIG. 3A.

In the illustrated workflow 300B, each intermediate tensor 315A-D corresponds to an application of a corresponding intermediate kernel 310A-D of FIG. 3A. In each such tensor 315A-D, a black square is used to indicate the center of the corresponding intermediate kernel application and a dotted-line box is used to depict the receptive field of the intermediate kernel, while a pentagon is used to indicate the center of the original 5×5 kernel. In this way, for each application of the original kernel (e.g., indicated by the location of the pentagon), multiple intermediate tensors are generated.

In some aspects, the system may perform each intermediate convolution operation to generate all of the intermediate tensors for the current position of the original kernel, and then accumulate these tensors to generate one or more elements in the output tensor, before moving to the next kernel position (e.g., before striding the original kernel). This may be referred to as in-step accumulation in some aspects.

In another aspect, the system may use each intermediate kernel multiple times (striding as appropriate) to cover the entire input tensor, resulting in larger intermediate tensors that cover the entire input tensor. The resulting intermediate tensors may be maintained (e.g., in system memory or tightly-coupled memory) and accumulated after all applications of each intermediate tensor have been completed. This may be referred to as batch accumulation in some aspects.

In some aspects, the system performs tensor volume shifting to allow for efficient accumulation of the intermediate tensors in-place (e.g., without requiring additional convolutions or other processes). Tensor volume shifting can generally include shifting the elements of one or more tensors to align the tensors, which allows element-wise summation to be readily applied. As indicated by the arrows 320A, 320B, and 320C, the system may generate an intermediate tensor 315A using intermediate kernel 310A, and shift this intermediate tensor using a defined offset based on the configuration of the system.

For example, the system may perform an operation shift $(M_a, \nabla_x \nabla_1) = \{M_a: x + \nabla_x, y + \nabla_y\}$, where $M_a$ is an intermediate tensor 315, $\nabla_x$ is the number of elements to be shifted in the x dimension (e.g., width), $\nabla_y$ is the number of elements to be shifted in the y dimension (e.g., height), and x and y are the center coordinates of the current intermediate kernel used to generate the intermediate tensor 315.

In the illustrated example, after generating the intermediate tensor 315A using the intermediate kernel 310A, the system may volume shift the intermediate tensor 315A two elements to the right. After applying the intermediate kernel 310B to generate intermediate tensor 315B, the system can efficiently use an element-wise addition to accumulate these tensors. For example, the system may perform an operation $accum(M_a, M_b) = M_a + M_b$, where $M_a$ is a first intermediate tensor (e.g., intermediate tensor 315A) and $M_b$ is a second intermediate tensor (e.g., intermediate tensor 315B). In some aspects, using zero-padding of the intermediate kernel(s) 310 as discussed above, any overlapping elements are mathematically cancelled to ensure that the tensor accumulation results in an accurate output tensor.

In some aspects, prior to such accumulation, the system performs appropriate volume shifting on one or more of the intermediate tensors. The volume-shifted intermediate tensors can then be efficiently accumulated using element-wise summation. Advantageously, using such in-place accumulation, the system need not change the number of channels in the input tensor or recast the intermediate tensors into different channels (which may be required if using other accumulation techniques, as discussed in more detail below). That is, each intermediate tensor can have a depth of one channel, and they can be accumulated in place in a single channel.

In some aspects, the accumulation and volume shift operations can be performed in various steps of a CNN, such as at the junction of skip and main branches.

Example Technique for Kernel Expansion and Pointwise Accumulation

Figure 3C:
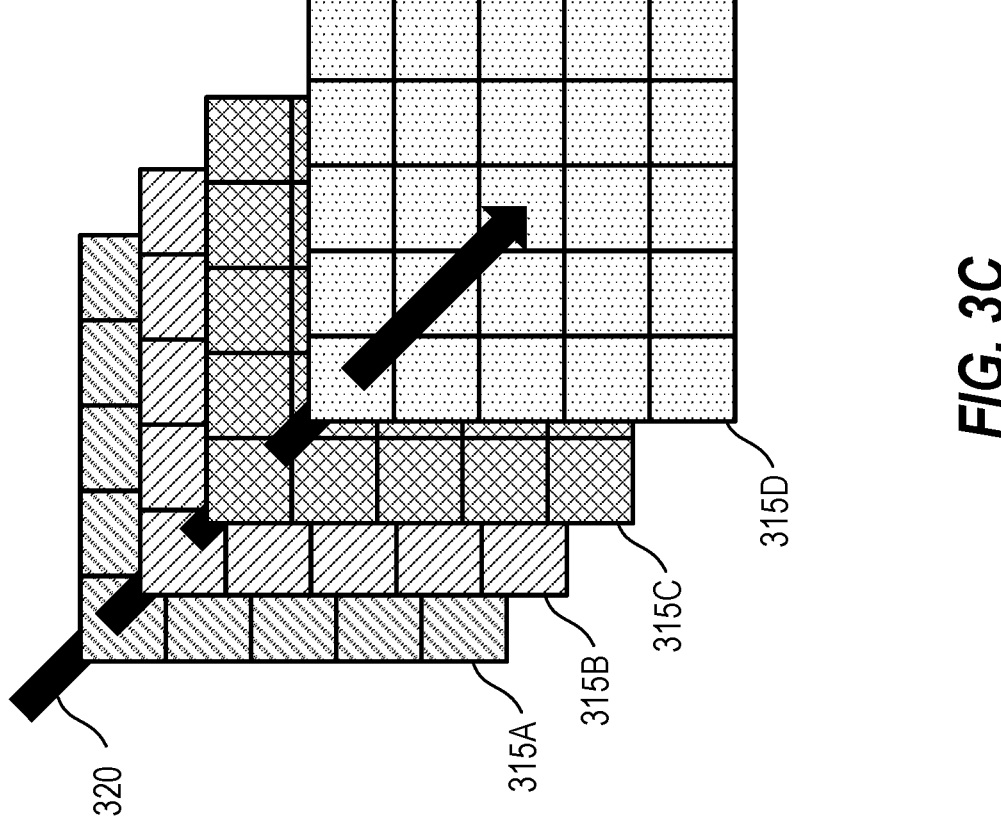
FIG. 3C depicts an example technique for pointwise accumulation and kernel expansion with intermediate kernels.

FIG. 3C depicts an example technique for pointwise accumulation and kernel expansion with intermediate kernels. In one aspect, the workflow 300C depicts a method of processing and accumulating intermediate tensors generated using the intermediate kernels 310 depicted in FIG. 3A. While the workflow 300B used in-place accumulation via element-wise summation, the workflow 300C corresponds to accumulation via pointwise convolution.

In the illustrated workflow 300C, each intermediate tensor 315A-D corresponds to an application of a corresponding intermediate kernel 310A-D from FIG. 3A. As discussed above, the intermediate tensors 315A-D may correspond to a single application of each intermediate kernel (e.g., for a single application of the original kernel, referred to as in-step accumulation), or may correspond to a series of applications of each intermediate kernel (to account for all applications of the original kernel, referred to as batch accumulation). In some aspects, the intermediate tensors 315 can be volume shifted, as discussed above, to account for the offset locations of each intermediate kernel application. That is, the intermediate tensors 315 may be volume shifted to ensure that the pointwise convolution is applied to the same coordinate for each respective tensor.

As illustrated, rather than using in-place accumulation (e.g., element-wise summation as discussed above with reference to FIG. 3B), the system can use a pointwise convolution 320 to accumulate the intermediate tensors and generate an output tensor. That is, the system can map each intermediate tensor 315 into a respective channel (thereby expanding the original number of channels C into nC in activation memory, where n is the number of intermediate kernels), and accumulate these channels into a single channel for the output tensor by using a pointwise convolution operation $accum(M_a, M_b) = M_a \oplus M_b$, where $\oplus$ is pointwise convolution.

In at least one aspect, rather than performing tensor volume shifting (as discussed above), the system may use address shifts when writing to or reading from the activation memory. In some aspects, tensor volume shifting is accomplished using address shifting. In at least one aspect, the needed physical address offsets are fixed (element-wise) between intermediate tensors. That is, a given tensor A(i, j) may have a fixed address offset from tensor B(i,j) for any i and j values. In such an aspect, predefined address offsets can be used to shift the tensors in order to align them for accumulation.

In various aspects, the workflow 300B or 300C may be used in the alternative to accumulate the intermediate tensors, depending on the particular hardware components available.

Example Kernel Expansions

Figure 4A:
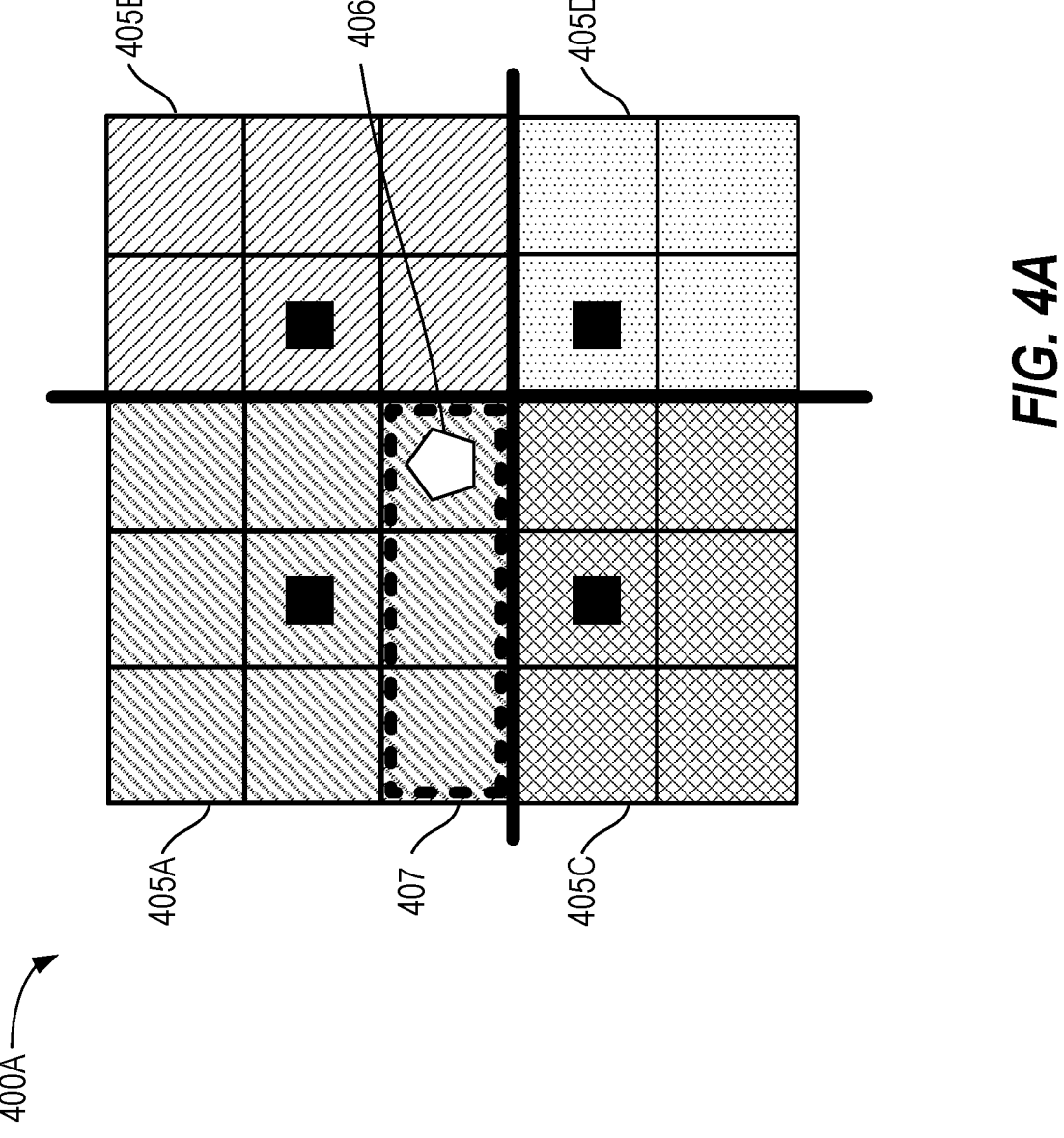
Figure 4B:
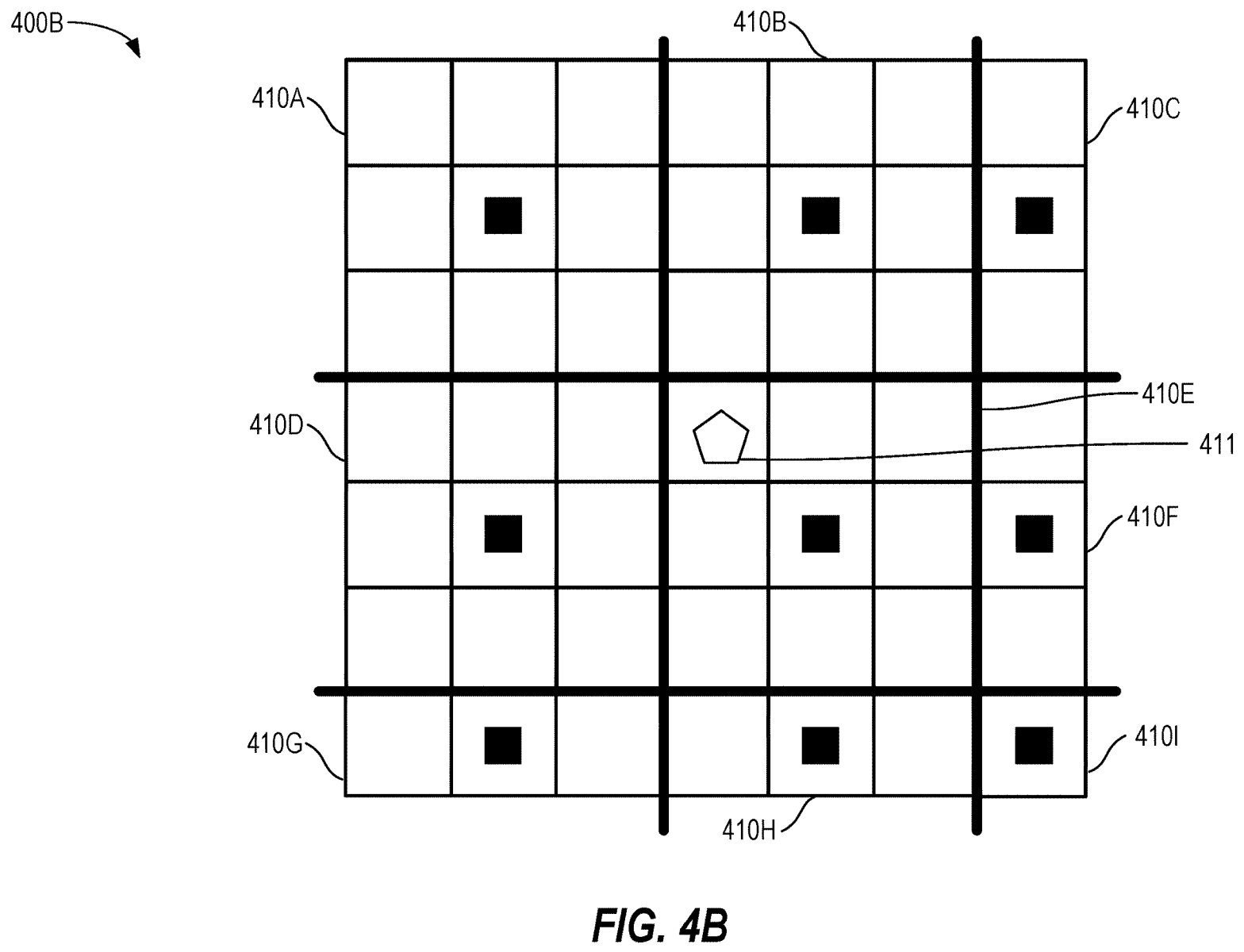
Figure 4C:

FIGS. 4A, 4B, and 4C depict example kernel expansions for various kernel sizes. Specifically, FIGS. 4A, 4B, and 4C depict various techniques to expand a 3×3 kernel (e.g., an example preferred kernel size of an example hardware component) to a larger size. In FIG. 4A, the larger kernel 400A is 5×5, in FIG. 4B, the larger kernel 400B is 7×7, and in FIG. 4C, the larger kernel 400C is 9×9.

As illustrated in FIG. 4A, the kernel 400A has a center indicated by a pentagon 406, and the kernel 400A can be decomposed into four intermediate 3×3 kernels 405A, 405B, 405C, and 405D, each of which has a center indicated by a respective black square. In the illustrated example, the various patterns and cross-hatching indicate the distribution of elements (from the kernel 400A) to the intermediate kernels 405.

Although the illustrated example includes particular kernel centers for conceptual clarity, it should be understood that the kernel centers may be offset in various implementations. For example, as the intermediate kernel 405D need only cover the lower-right four elements of the kernel 400A, the center of the intermediate kernel 405D may be located in any of these four elements.

In some aspects, if a given intermediate kernel 405 reaches beyond the bounds of the original kernel 400A (or overlaps with another intermediate kernel 405), then the corresponding elements are set to zero when performing the convolutions, which can reduce computations and thereby improve efficiency and power consumption. In the illustrated example, suppose the intermediate kernel 405C is a 3×3 kernel. When using the intermediate kernel 405C, the elements that overlap with the kernel 405A (indicated by box 407) may be set to zero. Alternatively, the intermediate kernel 405C may use non-zero values in these elements, and the corresponding elements in kernel 405A may be set to zero. Additionally, as illustrated, the center element (indicated by pentagon 406) may be set to zero in all but one of the intermediate kernels 405 (e.g., using the original value for intermediate kernel 405A, and values of zero in kernels 405B, 405C, and 405D). If the center of the intermediate kernel 405C was placed in the element directly below the illustrated center, then the bottom three elements of this intermediate kernel 405C (which extend beyond the edge of the original kernel 400A) can similarly be set to zero. This can prevent duplication of operations, thereby ensuring accurate results and improved computational efficiency.

In at least some aspects, rather than use zero-padding, the system can selectively use smaller intermediate kernels as appropriate. For example, rather than use a 3×3 intermediate kernel 405C (with or without zero-skipping), the system may use a 2×3 kernel. Similarly, rather than a 3×3 intermediate kernel 405B, a 3×2 kernel may be used. Additionally, a 2×2 kernel may be used for the intermediate kernel 405D.

Notably, while 5×5 kernel 400A may use four 3×3 intermediate kernels 405A-D in this example (or one 3×3 kernel, one 3×2 kernel, one 2×3 kernel, and one 2×2 kernel), four 3×3 intermediate kernels 405A-D could also be used to replace a 6×6 kernel with no additional operations, as compared to the 5×5 (assuming zero-skipping is not used). In some aspects, therefore, the system (or user) may elect to use larger convolutions in some aspects, depending on the particular configuration of the hardware and the architecture of the model(s) that will be used. For example, suppose the hardware is optimized for 3×3 kernels, and the CNN architecture calls for a 5×5 convolution. In one aspect, the system (or user) may elect to train and use the model using a 6×6 convolution, rather than the 5×5, in order to increase receptive field without requiring extra computational overhead.

As illustrated in FIG. 4B, a 7×7 kernel 400B has a center indicated by a pentagon 411, and the kernel 400B can be decomposed into nine intermediate kernels 410A-410I, each of which has a center indicated by a respective black square. Although the illustrated example includes particular kernel centers for conceptual clarity, as discussed above, it should be understood that the kernel centers may be offset in various implementations.

As discussed above, in some aspects, if a given intermediate kernel 410 reaches beyond the bounds of the original kernel 400B (or overlaps with another intermediate kernel 410), then the corresponding elements can be set to zero when performing the convolutions. This can prevent duplication of operations, thereby ensuring accurate results and improved computational efficiency. Similarly, as above, the system may selectively use smaller kernels (e.g., 3×1 kernels for intermediate kernels 410C and 410F, 1×3 kernels for intermediate kernels 410G and 410H, and a 1×1 kernel for intermediate kernel 410I).

Additionally, while the 7×7 kernel 400B requires the use of nine 3×3 intermediate kernels 410A-I (or four 3×3 kernels and five smaller kernels, as above), nine 3×3 intermediate kernels 410A-I could also be used to replace an 8×8 kernel or a 9×9 kernel, each with no additional operations as compared to the 7×7 kernel 400B.

One example of decomposing a 9×9 kernel 400C into nine intermediate kernels 415A-I is depicted in FIG. 4C. As illustrated, the 9×9 kernel 400C and the 7×7 kernel 400B can both be implemented using nine 3×3 intermediate kernels.

In some aspects, as discussed above, the system (or user) may similarly elect to use larger convolution kernels depending on the particular configuration of the hardware and the architecture of the model(s) that will be used. For example, the system (or user) may elect to train and use the CNN model using a 9×9 convolution, rather than the 7×7, in order to increase receptive field without requiring extra computational overhead.

Example Technique for Kernel Expansion Via Dimensionality Transformation

FIG. 5 depicts an example technique for kernel expansion using dimensionality transformation. The workflow 500 specifically depicts use of a space-to-depth dimensionality transformation 510 to reduce spatial dimensionality of an original input tensor 505 to generate a tensor 515, with increased depth (e.g., number of channels). In one aspect, the dimensionality transformation 510 rearranges an input tensor from a dimensionality of C×H×W to a dimensionality of $$C * r^2 \times \frac{H}{r} \times \frac{W}{r},$$

where C is the number of original channels, H and W are spatial dimensions (e.g., height and width, respectively), and r is a depth expansion ratio.

As the dimensionality transformation 510 involves only reshuffling of elements, which can be performed in hardware (e.g., using data re-addressing), it can be performed quickly and efficiently.

The illustrated example uses a 4×4 original kernel, and the dimensionality transformation 510 is used to change 4×4×1 patches of the input tensor to 2×2×4 tensors, allowing for efficient application of 2×2 intermediate kernels. However, the workflow 500 can be readily applied to various kernel sizes.

In at least one aspect, using the workflow 500, the system can implement a 5×5 convolution kernel using one or more intermediate kernels (e.g., 2×2 or 3×3 intermediate kernels), each of which may have zeros filled in for one or more elements that extend beyond the edge of the original kernel. For example, for an original 5×5 kernel, 6×6×1 patches the input tensor may be transformed to 3×3×2 tensors, which can then be efficiently convolved with 3×3 kernels (with the bottom and rightmost rows of the 3×3 intermediate kernels being zero-filled). Similarly, for an original 6×6 kernel, 6×6×1 patches the input tensor may be transformed to 3×3×2 Tensors, which can then be efficiently convolved with 3×3 kernels.

It should be appreciated that a 6×6 kernel, with a larger receptive field than an original 5×5 kernel, can be substituted in some aspects with no increase in memory or compute operations, as discussed above.

In one aspect, the workflow 500 can be used to perform a 6×6 volumetric or depthwise convolution on the input tensor with dimensionality $C_{in}$ (before the dimensionality transformation) by using an equivalent a 3×3 groupwise convolution $$\left(\text{with a number of groups} = \frac{C_{in}}{r^2}\right)$$

after dimensionality transformation 510. Thus, in some aspects, each channel of the input tensor can be transformed to $r^2$ channels prior to application of the convolution kernel (s). In at least one aspect, the depth expansion ratio r is defined based in part on the original kernel size and/or the preferred kernel size for the hardware.

Notably, in some aspects, $r^2$ intermediate kernels may be required to perform this convolution for each channel of the input tensor. For example, in the illustrated workflow 500, four 2×2 intermediate kernels can be used to perform the original 4×4 convolution. If the input tensor has two channels, then eight 2×2 intermediate kernels may be used.

In one aspect, if the original (e.g., 6×6 or 5×5) convolution kernel has a stride s that is divisible by the depth expansion ratio r, then the corresponding 3×3 groupwise convolution (using intermediate kernels) can use a stride of $$\frac{s}{r}.$$

If the original convolution has a stride s that is not divisible by the depth expansion ratio r, then the system may use a fixed reshuffling (or re-addressing) of channels in every group. This can be programmed into the hardware.

As discussed above, the dimensionality transformation techniques can be expanded for other larger kernel sizes as well. For example, a 7×7 original kernel can be implemented using an 8×8 kernel with zeros filled in on the bottom and rightmost rows. For such an 8×8 kernel, the input tensor can be transformed using the dimensionality transformation 510 to be convolved with smaller (e.g., 2×2 or 4×4 kernels. Note that, as above, the 8×8 kernel, with a larger receptive field, can be substituted with no increase in memory or computational requirements (assuming zero-skipping is not used). In at least one aspect, different r values can be used depending on the kernel sizes. For example, for a 7×7 kernel, an r value of four may be used.

Example Method for Convolution Using Optimized Hardware

FIG. 6 is an example flow diagram illustrating a method 600 for performing kernel convolution using hardware optimized for smaller kernel sizes. In various aspects, the method 600 may be used during training of a model (e.g., during a forward pass), as well as during inferencing using the trained model.

The method 600 begins at block 605, where a data tensor is received for convolution. For example, the data tensor may act as input to a first or subsequent layer of a neural network (e.g., a CNN).

At block 610, the system identifies the corresponding convolution kernel that is to be convolved with the received data tensor. For example, the CNN model architecture may specify the kernel to be applied to received tensors in the given layer.

The method 600 continues to block 615, where the system decomposes the identified kernel into two or more intermediate kernels. In some aspects, the intermediate kernels are generated based on a preferred kernel size of the hardware used to perform the convolution (e.g., 3×3 or 5×5). In at least one aspect, the system only decomposes the kernel upon determining that the kernel size exceeds the preferred kernel size (or a hardware-limited kernel size).

For example, as discussed above, the system may use non-overlapping kernel expansion to process different subsets of the kernel sequentially or in parallel (e.g., as described above with reference to FIG. 2), kernel expansion and accumulation via a set of smaller intermediate kernels (e.g., as described above with reference to FIGS. 3A-3C and FIGS. 4A-4C), dimensionality transformations to modify the dimensionality of the kernel or tensor (e.g., as described above with reference to FIG. 5), and the like.

At block 620, the system performs a set of convolutions for the intermediate kernels using the available hardware, which is designed and/or optimized for the intermediate kernel size. This can improve efficiency of the system while allowing for significantly increased flexibility.

At block 625, the system can accumulate the resulting intermediate tensors in order to generate an output tensor for the identified convolution kernel. In various aspects, this accumulation may include, without limitation, in-place accumulation (e.g., via element-wise summation) or pointwise convolution as discussed above. Similarly, the accumulation may be performed using batch accumulation (e.g., processing each intermediate kernel multiple times to span the entire input tensor) or in-step accumulation (e.g., using each intermediate kernel once before accumulating the results and proceeding to the next application of the original kernel).

Example Method for Convolution Using Intermediate Kernels

FIG. 7 is an example flow diagram illustrating a method 700 for performing convolution using intermediate kernels.

At block 705, a system receives, at a first layer in a neural network, an input data tensor.

At block 710, the system generates a plurality of intermediate tensors by performing a plurality of intermediate convolutions using a plurality of intermediate kernels with a size of a preferred size.

In some aspects, the preferred size corresponds to one or more hardware components of a computer.

At block 715, the system accumulates the plurality of intermediate tensors to generate an output tensor for a first convolution using a first kernel, wherein the first kernel has a size greater than the preferred size.

In some aspects, performing the first convolution for the first kernel comprises: performing a first intermediate convolution on a set of elements in a central region in the data tensor, and performing a second intermediate convolution on a set of elements on a perimeter of the data tensor.

In some aspects, the method 700 further comprises, prior to accumulating the plurality of intermediate tensors, volume shifting each of the plurality of intermediate tensors.

In some aspects, accumulating the plurality of intermediate tensors comprises performing element-wise summation of the plurality of intermediate tensors.

In some aspects, accumulating the plurality of intermediate tensors comprises performing pointwise accumulation on the plurality of intermediate tensors.

In some aspects, at least a first intermediate kernel of the plurality of intermediate kernels includes one or more empty elements, and performing an intermediate convolution using the first intermediate kernel comprises refraining from processing each of the one or more empty elements.

In some aspects, performing the first convolution for the first kernel further comprises applying a space-to-depth technique to generate the plurality of intermediate tensors by reducing a spatial dimensionality of the data tensor and increasing a depth of the data tensor based on a depth expansion ratio r.

In some aspects, the first convolution is performed using a stride equal to s, wherein s is divisible by r, and the plurality of intermediate convolutions are performed using a stride equal to $$\frac{s}{r}.$$

In some aspects, the first convolution is performed using a stride equal to s, wherein s is not divisible by r, and the plurality of intermediate convolutions are performed using a fixed reshuffling or re-addressing of channels in the plurality of intermediate tensors.

In some aspects, performing the first convolution for the first kernel is performed using in-step accumulation, comprising generating a plurality of intermediate tensors by performing a plurality of intermediate in-step convolutions, performing in-step activation shifting of each of the plurality of intermediate tensors, and performing in-step activation accumulation of the plurality of shifted intermediate tensors.

Example Processing System for Kernel Expansion

In some aspects, the workflows, techniques, and methods described with reference to FIGS. 1-7 may be implemented on one or more devices or systems. FIG. 8 depicts an example processing system 800 configured to perform various aspects of the present disclosure, including, for example, the techniques and methods described with respect to FIGS. 1-7.

Processing system 800 includes a central processing unit (CPU) 802, which in some examples may be a multi-core CPU. Instructions executed at the CPU 802 may be loaded, for example, from a program memory associated with the CPU 802 or may be loaded from a memory partition 824.

Processing system 800 also includes additional processing components tailored to specific functions, such as a graphics processing unit (GPU) 804, a digital signal processor (DSP) 806, a neural processing unit (NPU) 808, a multimedia processing unit 810, and a wireless connectivity component 812.

An NPU, such as 808, is generally a specialized circuit configured for implementing all the necessary control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing units (TPU), neural network processor (NNP), intelligence processing unit (IPU), vision processing unit (VPU), or graph processing unit.

NPUs, such as 808, are configured to accelerate the performance of common machine learning tasks, such as image classification, machine translation, object detection, and various other predictive models. In some examples, a plurality of NPUs may be instantiated on a single chip, such as a system on a chip (SoC), while in other examples they may be part of a dedicated neural-network accelerator.

NPUs may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process it through an already trained model to generate a model output (e.g., an inference).

In one implementation, NPU 808 is a part of one or more of CPU 802, GPU 804, and/or DSP 806.

In some examples, wireless connectivity component 812 may include subcomponents, for example, for third generation (3G) connectivity, fourth generation (4G) connectivity (e.g., 4G LTE), fifth generation connectivity (e.g., 5G or NR), Wi-Fi connectivity, Bluetooth connectivity, and other wireless data transmission standards. Wireless connectivity processing component 812 is further connected to one or more antennas 814.

Processing system 800 may also include one or more sensor processing units 816 associated with any manner of sensor, one or more image signal processors (ISPs) 818 associated with any manner of image sensor, and/or a navigation processor 820, which may include satellite-based positioning system components (e.g., GPS or GLONASS) as well as inertial positioning system components.

Processing system 800 may also include one or more input and/or output devices 822, such as screens, touch-sensitive surfaces (including touch-sensitive displays), physical buttons, speakers, microphones, and the like.

In some examples, one or more of the processors of processing system 800 may be based on an ARM or RISC-V instruction set.

Processing system 800 also includes memory 824, which is representative of one or more static and/or dynamic memories, such as a dynamic random access memory, a flash-based static memory, and the like. In this example, memory 824 includes computer-executable components, which may be executed by one or more of the aforementioned processors of processing system 800.

In particular, in this example, memory 824 includes convolution component 824A, tensor shift component 824B, and accumulation component 824C. The memory 824 also includes model parameters 824D, intermediate kernel(s) 824E, and intermediate tensor(s) 824F. The depicted components, and others not depicted, may be configured to perform various aspects of the techniques described herein. Though depicted as discrete components for conceptual clarity in FIG. 8, convolution component 824A, tensor shift component 824B, and accumulation component 824C may be collectively or individually implemented in various aspects.

Processing system 800 further comprises convolution circuit 826, tensor shift circuit 828, and accumulation circuit 830. The depicted circuits, and others not depicted, may be configured to perform various aspects of the techniques described herein.

For example, convolution component 824A and convolution circuit 826 may be used to convolve kernels with input tensors, tensor shift component 824B and tensor shift circuit 828 may be used to shift intermediate tensors prior to accumulation, and accumulation component 824C and accumulation circuit 830 may be used to accumulate the intermediate tensors to generate an output tensor.

Though depicted as separate components and circuits for clarity in FIG. 8, convolution circuit 826, tensor shift circuit 828, and accumulation circuit 830 may collectively or individually be implemented in other processing devices of processing system 800, such as within CPU 802, GPU 804, DSP 806, NPU 808, and the like.

Generally, processing system 800 and/or components thereof may be configured to perform the methods described herein.

Notably, in other aspects, aspects of processing system 800 may be omitted, such as where processing system 800 is a server computer or the like. For example, multimedia component 810, wireless connectivity 812, sensors 816, ISPs 818, and/or navigation component 820 may be omitted in other aspects. Further, aspects of processing system 800 maybe distributed between multiple devices.

Example Clauses

Clause 1: A method, comprising: receiving, at a first layer in a neural network, an input data tensor; and performing a first convolution for a first kernel, wherein the first kernel has a size greater than a preferred size, comprising: generating a plurality of intermediate tensors by performing a plurality of intermediate convolutions using a plurality of intermediate kernels with a size of the preferred size; and accumulating the plurality of intermediate tensors to generate an output tensor for the first convolution Clause 2: A method according to Clause 1, wherein performing the first convolution for the first kernel comprises: performing a first intermediate convolution on a set of elements in a central region in the input data tensor; and performing a second intermediate convolution on a set of elements on a perimeter of the input data tensor.

Clause 3: A method according to any one of Clauses 1-2, further comprising: prior to accumulating the plurality of intermediate tensors, volume shifting each of the plurality of intermediate tensors.

Clause 4: A method according to any one of Clauses 1-3, wherein accumulating the plurality of intermediate tensors comprises performing element-wise summation of the plurality of intermediate tensors.

Clause 5: A method according to any one of Clauses 1-4, wherein accumulating the plurality of intermediate tensors comprises performing pointwise accumulation on the plurality of intermediate tensors.

Clause 6: A method according to any one of Clauses 1-5, wherein at least a first intermediate kernel of the plurality of intermediate kernels includes one or more empty elements, and wherein performing an intermediate convolution using the first intermediate kernel comprises refraining from processing each of the one or more empty elements.

Clause 7: A method according to any one of Clauses 1-6, wherein performing the first convolution for the first kernel further comprises: applying a space-to-depth technique to generate the plurality of intermediate tensors by reducing a spatial dimensionality of the input data tensor and increasing a depth of the input data tensor based on a depth expansion ratio r.

Clause 8: A method according to any one of Clauses 1-7, wherein: the first convolution is performed using a stride equal to s, wherein s is divisible by r; and the plurality of intermediate convolutions are performed using a stride equal w $$\frac{s}{r}.$$

Clause 9: A method according to any one of Clauses 1-8, wherein: the first convolution is performed using a stride equal to s, wherein s is not divisible by r; and the plurality of intermediate convolutions are performed using a fixed reshuffling or re-addressing of channels in the plurality of intermediate tensors.

Clause 10: A method according to any one of Clauses 1-9, wherein performing the first convolution for the first kernel is performed using in-step accumulation, comprising: generating a plurality of intermediate tensors by performing a plurality of intermediate in-step convolutions; performing in-step activation shifting of each of the plurality of intermediate tensors; and performing in-step activation accumulation of the plurality of shifted intermediate tensors.

Clause 11: A method according to any one of Clauses 1-10, wherein the preferred size corresponds to one or more hardware components of a computer.

Clause 12: A system, comprising: a memory comprising computer-executable instructions; and one or more processors configured to execute the computer-executable instructions and cause the processing system to perform a method in accordance with any one of Clauses 1-11.

Clause 13: A system, comprising means for performing a method in accordance with any one of Clauses 1-11.

Clause 14: A non-transitory computer-readable medium comprising computer-executable instructions that, when executed by one or more processors of a processing system, cause the processing system to perform a method in accordance with any one of Clauses 1-11.

Clause 15: A computer program product embodied on a computer-readable storage medium comprising code for performing a method in accordance with any one of Clauses 1-11.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, the term "connected to", in the context of sharing electronic signals and data between the elements described herein, may generally mean in data communication between the respective elements that are connected to each other. In some cases, elements may be directly connected to each other, such as via one or more conductive traces, lines, or other conductive carriers capable of carrying signals and/or data between the respective elements that are directly connected to each other. In other cases, elements may be indirectly connected to each other, such as via one or more data busses or similar shared circuitry and/or integrated circuit elements for communicating signals and data between the respective elements that are indirectly connected to each other.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method of machine learning, comprising:
   receiving, at a first layer in a neural network, an input data tensor; and performing a first convolution for a first kernel in the first layer in the neural network, wherein the first kernel has a size greater than a preferred size, comprising:
   generating a plurality of intermediate tensors by performing a plurality of intermediate convolutions using the input data tensor and a plurality of intermediate kernels with a size of the preferred size, wherein an intermediate kernel of the plurality of intermediate kernels comprises a portion of the first kernel and has the same number of dimensions as the first kernel; and
   accumulating the plurality of intermediate tensors to generate an output tensor for the first convolution.

2. The method of claim 1, wherein performing the first convolution for the first kernel comprises:
   performing a first intermediate convolution on a set of elements in a central region in the input data tensor; and
   performing a second intermediate convolution on a set of elements on a perimeter of the input data tensor.

3. The method of claim 1, further comprising:
   prior to accumulating the plurality of intermediate tensors, volume shifting each of the plurality of intermediate tensors.

4. The method of claim 1, wherein accumulating the plurality of intermediate tensors comprises at least one of:
   performing element-wise summation of the plurality of intermediate tensors, or
   performing pointwise accumulation on the plurality of intermediate tensors.

5. The method of claim 1, wherein the preferred size corresponds to one or more hardware components of a computer.

6. The method of claim 1, wherein:
   at least a first intermediate kernel of the plurality of intermediate kernels includes one or more empty elements, and
   performing an intermediate convolution using the first intermediate kernel comprises refraining from processing each of the one or more empty elements.

7. The method of claim 1, wherein performing the first convolution for the first kernel further comprises:
   applying a space-to-depth technique to generate the plurality of intermediate tensors by reducing a spatial dimensionality of the input data tensor and increasing a depth of the input data tensor based on a depth expansion ratio r.

8. The method of claim 7, wherein:
   the first convolution is performed using a stride equal to s, wherein s is divisible by r; and
   the plurality of intermediate convolutions are performed using a stride equal $$\frac{s}{r}.$$

9. The method of claim 7, wherein:
   the first convolution is performed using a stride equal to s, wherein s is not divisible by r; and
   the plurality of intermediate convolutions are performed using a fixed reshuffling or re-addressing of channels in the plurality of intermediate tensors.

10. The method of claim 1, wherein performing the first convolution for the first kernel is performed using in-step accumulation, comprising:
   generating a plurality of intermediate tensors by performing a plurality of intermediate in-step convolutions;

performing in-step activation shifting of each of the plurality of intermediate tensors; and performing in-step activation accumulation of the plurality of shifted intermediate tensors.

11. A processing system comprising:

at least one memory comprising computer-executable instructions; and one or more processors configured to execute the computer-executable instructions and cause the processing system to perform an operation comprising:

receiving, at a first layer in a neural network, an input data tensor; and performing a first convolution for a first kernel in the first layer in the neural network, wherein the first kernel has a size greater than a preferred size, comprising:

generating a plurality of intermediate tensors by performing a plurality of intermediate convolutions using the input data tensor and a plurality of intermediate kernels with a size of the preferred size, wherein an intermediate kernel of the plurality of intermediate kernels comprises a portion of the first kernel and has the same number of dimensions as the first kernel; and accumulating the plurality of intermediate tensors to generate an output tensor for the first convolution.

12. The processing system of claim 11, wherein performing the first convolution for the first kernel comprises:

performing a first intermediate convolution on a set of elements in a central region in the input data tensor; and performing a second intermediate convolution on a set of elements on a perimeter of the input data tensor.

13. The processing system of claim 11, the operation further comprising:

prior to accumulating the plurality of intermediate tensors, volume shifting each of the plurality of intermediate tensors.

14. The processing system of claim 11, wherein accumulating the plurality of intermediate tensors comprises performing element-wise summation of the plurality of intermediate tensors.

15. The processing system of claim 11, wherein accumulating the plurality of intermediate tensors comprises performing pointwise accumulation on the plurality of intermediate tensors.

16. The processing system of claim 11, wherein:

at least a first intermediate kernel of the plurality of intermediate kernels includes one or more empty elements, and performing an intermediate convolution using the first intermediate kernel comprises refraining from processing each of the one or more empty elements.

17. The processing system of claim 11, wherein performing the first convolution for the first kernel further comprises:

applying a space-to-depth technique to generate the plurality of intermediate tensors by reducing a spatial dimensionality of the input data tensor and increasing a depth of the input data tensor based on a depth expansion ratio r.

18. The processing system of claim 17, wherein:

the first convolution is performed using a stride equal to s, wherein s is divisible by r; and the plurality of intermediate convolutions are performed using a stride equal to $$\frac{s}{r}.$$

19. The processing system of claim 17, wherein:

the first convolution is performed using a stride equal to s, wherein s is not divisible by r; and the plurality of intermediate convolutions are performed using a fixed reshuffling or re-addressing of channels in the plurality of intermediate tensors.

20. The processing system of claim 11, wherein performing the first convolution for the first kernel is performed using in-step accumulation, comprising:

generating a plurality of intermediate tensors by performing a plurality of intermediate in-step convolutions;

performing in-step activation shifting of each of the plurality of intermediate tensors; and performing in-step activation accumulation of the plurality of shifted intermediate tensors.

21. A non-transitory computer-readable medium comprising computer-executable instructions that, when executed by one or more processors of a processing system, cause the processing system to perform an operation comprising:

receiving, at a first layer in a neural network, an input data tensor; and performing a first convolution for a first kernel in the first layer in the neural network, wherein the first kernel has a size greater than a preferred size, comprising:

generating a plurality of intermediate tensors by performing a plurality of intermediate convolutions using the input data tensor and a plurality of intermediate kernels with a size of the preferred size, wherein an intermediate kernel of the plurality of intermediate kernels comprises a portion of the first kernel and has the same number of dimensions as the first kernel; and accumulating the plurality of intermediate tensors to generate an output tensor for the first convolution.

22. The non-transitory computer-readable medium of claim 21, wherein performing the first convolution for the first kernel comprises:

performing a first intermediate convolution on a set of elements in a central region in the input data tensor; and performing a second intermediate convolution on a set of elements on a perimeter of the input data tensor.

23. The non-transitory computer-readable medium of claim 21, the operation further comprising:

prior to accumulating the plurality of intermediate tensors, volume shifting each of the plurality of intermediate tensors.

24. The non-transitory computer-readable medium of claim 21, wherein accumulating the plurality of intermediate tensors comprises performing element-wise summation of the plurality of intermediate tensors.

25. The non-transitory computer-readable medium of claim 21, wherein accumulating the plurality of intermediate tensors comprises performing pointwise accumulation on the plurality of intermediate tensors.

26. The non-transitory computer-readable medium of claim 21, wherein:

at least a first intermediate kernel of the plurality of intermediate kernels includes one or more empty elements, and performing an intermediate convolution using the first intermediate kernel comprises refraining from processing each of the one or more empty elements.

27. The non-transitory computer-readable medium of claim 21, wherein performing the first convolution for the first kernel further comprises:

applying a space-to-depth technique to generate the plurality of intermediate tensors by reducing a spatial dimensionality of the input data tensor and increasing a depth of the input data tensor based on a depth expansion ratio r.

28. The non-transitory computer-readable medium of claim 27, wherein:

the first convolution is performed using a stride equal to s, wherein s is divisible by r; and the plurality of intermediate convolutions are performed using a stride equal to $$\frac{s}{r}.$$

29. The non-transitory computer-readable medium of claim 21, wherein performing the first convolution for the first kernel is performed using in-step accumulation, comprising:

generating a plurality of intermediate tensors by performing a plurality of intermediate in-step convolutions;

performing in-step activation shifting of each of the plurality of intermediate tensors; and performing in-step activation accumulation of the plurality of shifted intermediate tensors.

30. A processing system comprising:

means for receiving, at a layer in a neural network, an input data tensor; and means for performing a convolution for a first kernel in the layer in the neural network, wherein the first kernel has a size greater than a preferred size, the means for performing comprising:

means for generating a plurality of intermediate tensors by performing a plurality of intermediate convolutions using the input data tensor and a plurality of intermediate kernels with a size of the preferred size, wherein an intermediate kernel of the plurality of intermediate kernels comprises a portion of the first kernel and has the same number of dimensions as the first kernel; and means for accumulating the plurality of intermediate tensors to generate an output tensor for the convolution.

* * * * *